3,326,035
METHOD FOR DETECTING LEAKS IN
PROCESS EQUIPMENT
Nobuyoshi Hirota and Yoshio Onoshima, Nagasaki-shi,
Japan, assignors to Mitsubishi Jukogyo Kabushiki
Kaisha, Tokyo, Japan
No Drawing. Filed June 25, 1965, Ser. No. 467,120
Claims priority, application Japan, June 30, 1964,
39/37,228
12 Claims. (Cl. 73—40)

This invention relates to process equipment, and in general, to tanks, vessels and containers used in pressure work. More specifically, the invention relates to a method for detecting leaks in every type of equipment used in connection with work where pressure control is essential. The invention also, broadly, relates to process equipment which has to be evacuated, where it is necessary to prevent leaks.

Pressure work is frequently conducted in every laboratory and industrial plant, and the importance of preventing leaks in the equipment is obvious. Not only the success of the operation may depend on the absence of leaky seams and cracks, but the danger of explosion and poisoning exists if the system is not tight. However, in spite of the widespread use of pressure reactions, very few methods are available for detecting leaks, and considerable amounts of time and labor is spent in determining the presence and location of leaks in the system.

The oldest and most common method consists of applying externally a soap solution to the joint or to the point of the apparatus where a leak or crack is believed to be present, and simultaneously introducing a gas into the apparatus under pressure. The appearance of bubbles indicates a leak in the joint or the presence of a crack. Although the method is readily available and inexpensive, the main drawback is that the bubbles have very short life, in the range of a few seconds, and may not be observed by the operator.

Some improvement has been achieved by the application of surface-active agents which form a foam, in the proximity of cracks and leaky joints, when a gas under pressure is introduced in the apparatus. Although the use of the surface-active agents rather than soap is preferable because the foams have somewhat longer life, still the method is far from satisfactory. The main reason is that the size and duration of the foams are affected by a number of factors, such as the pressure of the gas being introduced into the apparatus, the shape and size of the joint or crack, whether it is a minute hole or a plurality of openings or a leaky seam, the direction of the crack, whether vertical or horizontal, and the surface tension of the foaming agent being used as indicator. For instance, if a plurality of minute openings are present in the apparatus rather than a long seam, the compressed gas escapes in finely dispersed form, the foam is more stable, and the chances that the operator will observe the gas coming out from the leaks is far greater than in the case of a leak through a joint. It is manifest, however, that, in view of the impossibility of controlling so many factors, also this method leaves a lot to be desired and is not reliable.

Winter and coworkers in Ind. Eng. Chem. 50 No. 5, 53A (1958) reviewed the established methods for detecting leaks in process equipment. The radioactive tracer method is expensive since it involves the use mainly of radioactive phosphorous. The infrared leak detector is based on the use of nitrous oxide and detection of the leak as the gas escapes. The halide torch method utilizes a halide torch for detecting a leak, and necessitates the introduction of both Freon and air within the apparatus. Other methods are essentially based on the color change of different indicators.

The method of U.S.P. 2,845,394 is based on the use of an indicator, composed of lead chloride, manganese dioxide and a sodium silicate binder. Upon leakage of steam, lead chloride deposits as a white precipitate on the exterior of the apparatus, and may be readily observed. The method, although satisfactory, is not of general application because manifestly limited to steam and water leakage.

One object of the present invention is to provide a method for general use in detecting leaks, in every sort of apparatus, irrespective of the shape, size or direction of the opening or crack.

Another object of this invention is to provide a leak indicator, which gives a foam of at least 30-minute life, that is, far longer than the commonly used soap solution or surface-active agents.

Another object is to provide an indicator for the points of leakage which may readily be obtained as a solid foam.

A further object is to provide a method which is inexpensive, reliable, and easily applicable with every sort of equipment, not only metal containers.

The crux of the present invention resides in the application to the portion of the apparatus where the presence of a leak is suspected of an aqueous solution of a substance capable of forming a continous film of microcrystals after evaporation of water, so that the solution, at first, permeates the entire surface surrounding the leakage and leaves, after drying, a microcrystalline continuous film. In a second step, a gas under pressure, preferably air, is introduced into the apparatus, and a soap solution, a surface-active agent, is applied externally. The purpose of the crystalline film is to provide a continuous porous surface, whereby air escapes in finely dispersed form.

The surface-active agent or soap solution, under the action of the underlying microcrystalline film, forms a fine stable foam. According to a preferred embodiment of the invention, a solidifying agent is added, so that a solid foam is obtained.

Any substance soluble in water and capable of forming on drying a continuous film of microcrystals, may be used. Particularly advantageous, within the scope of the invention, are phosphates and chromates, or a mixture of a phosphate and a chromate. The phosphate is a salt of a metal between barium and iron in the electromotive force series. It may also be phosphoric acid itself, which, in contact with the metallic equipment, and rust, usually present therein, forms iron phosphate. Instead of orthophosphoric acid and its salts, also metaphosphoric and pyrophosphoric acid and their corresponding salts, may be used.

As a source of chromate, chromic anhydride may be used, instead of the unstable chromic acid, that is, $H_2CrO_4$. The chromates or dichromates of a metal from potassium to lithium, in the electromotive series, namely potassium, sodium and lithium, such as $K_2CrO_4$, $Na_2CrO_4$, $Li_2CrO_4$, and $K_2Cr_2O_7$, $Na_2Cr_2O_7$ and $Li_2Cr_2O_7$ may be used. Chromic anhydride is advantageous because of its action on the rust of the equipment, to form $FeCrO_4$.

According to a preferred embodiment of the invention, a nonionic surface-active agent, for instance polyoxyethylene alkylphenol ether, and an organic solvent which is, at least partially, miscible with water, are added to the aqueous solution. Thus, ethyl propyl isopropyl, n-butyl, sec. butyl, tert. butyl alcohol may be used. The purpose of the solvent is to dissolve oils and organic contaminants which may be present in the apparatus. Evaporation of the water is also accelerated, because drying is complete in a period of time between 10 and 30 minutes.

The surface-active agent, which is applied externally as an indicator for the leak, may be an anionic surface-active agent, for instance sodium alkyl allyl sulfonate, or a nonionic surface-active agent, such as polyoxyethylene alkyl phenol ether, or a surface-active agent containing an aromatic nucleus such as an alkyl benzene or naphthalene sulfonate. As already mentioned, according to the preferred embodiment of the invention, a solidifying agent, such as urea-formaldehyde resin plus gelatin and/or acrylester resin plus gelatin etc. is added to the surface-active agent to facilitate drying and hardening and to yield a solid foam.

It is manifest from the above, that the indicator, within the scope of the invention, is a stable fine foam of a surface-active agent, or a solid foam, superimposed on a continuous film of microcrystalline material, the latter acting as a porous surface for the gas under pressure to escape from the apparatus in finely dispersed form.

Although the proportions of each ingredient in the solution are not crucial, it is advantageous to use between 80 and 90 parts of water, between 3 and 5 parts of organic solvent, between 5 and 20 parts of the component which is to be deposited in the form of a microcrystalline film, and between 1 and 3 parts of the nonionic surface-active agent. The solution may be applied by spraying or brushing to the apparatus where a leak is suspected.

The following examples are described in detail for the purpose of better illustration of the invention.

*Example 1*

A solution of 20 parts by weight of orthophosphoric acid, 80 parts of water, 5 parts of n-butyl alcohol, 2 parts of a nonionic surface-active agent, that is, polyoxyethylene alkyl phenol ether, was applied with a brush onto several spots of the equipment, where a leak was suspected. The solution dissolved rust and organic oily impurities. After drying, at normal temperature, which took 30 minutes, a porous film of crystalline iron meta and pyrophosphate was deposited on the spots where the solution had been applied. Then air under a pressure of 0.3 kg./cm.$^2$ was introduced into the apparatus, and an aqueous 1% solution of sodium alkyl allyl sulfonate was applied with a brush. In the points of leakage, a fine foam was produced, which was stable and could be readily detected for at least 30 minutes.

*Example 2*

A solution containing 79 parts of water, 5 parts of n-butyl alcohol, 5 parts of zinc dihydrogen phosphate, $Zn(H_2PO_4)_2$ and 2 parts of the nonionic surface-active agent, polyoxyethylene alkyl phenol ether, was sprayed upon the parts of the apparatus, where a leak was suspected. Drying required 10 minutes. There was left a microcrystalline film of zinc and iron pyrophosphate and metaphosphate. Air under pressure was introduced into the apparatus as in Example 1, and simultaneously, an aqueous solution of a surface-active agent, sodium dodecylbenzene sulfonate additionally containing an urea-formaldehyde resin plus gelatine was applied with a brush. Solidification occurred in a period of 5 to 10 minutes, and left a hard foam, satisfactory to detect leakages for at least 30 minutes.

*Example 3*

A solution containing 75 parts of water, 5 parts of zinc dihydrogen orthophosphate, 5 parts of chromic anhydride, 5 parts of isopropyl alcohol, and 2 parts of the same nonionic surface-active agent used in Examples 1 and 2, was sprayed upon the joints of the equipment where a leak was suspected and allowed to dry. As a result of the reaction of chromic anhydride with the rust, iron chromate was formed in addition to zinc pyrophosphate and metaphosphate, as in Example 2. Then the same surface-active agent used in Example 2, sodium dodecylbenzene sulfonate additionally containing a solidifying agent, urea-formaldehyde resin plus gelatine was applied with a brush. The solution rapidly solidified to give a hard foam, suitable for detection of leaks, when air was introduced into the apparatus, for a period of at least 30 minutes.

It is manifest from the above, that several advantages result from this instant invention. Instead of bubbles which have a short life, only a few seconds, and which are difficult to detect, the indicator for the leakage, according to the method described herein, is a stable and fine foam, or a hard solid foam, and is effective, irrespective of the plane of the surface upon which it is applied, whether vertical, diagonal or horizontal.

The crystalline film of metal phosphates and chromates, in accordance with this instant invention, promotes curing of the surface-active agent, which is used as indicator. Table 1 below gives comparative data of the curing time at 25° C., of (a) surface-active agent, as a foam and (b) as a film. Column 2 gives the results with the untreated surface. Column 3 gives the results with a surface which is previously coated with a microcrystalline film of phosphates and chromates.

TABLE 1.—CURING TIME, IN MINUTES, AT 25° C. OF THE SURFACE-ACTIVE AGENT

| | Untreated surface | Treated surface |
|---|---|---|
| Foam | 10–15 | 5–10 |
| Hard film | 20–30 | 10–15 |

It is manifest from the above data, that the microcrystalline film of phosphates or chromates promotes and accelerates hardening and curing of both the foam and of the film.

Another advantage resulting from the method in accordance with this invention is that it is suitable for application even with welded equipment, where the alkaline flux used in welding, ordinarily would interfere with the curing of the film. Table 2 below gives comparative data of the curing time of, for example, alkylarylsulfonate as a surface-active agent, with welding equipment.

TABLE 2.—CURING TIME, IN MINUTES, at 25° C., OF A FILM OF THE SURFACE-ACTIVE AGENT

Untreated surface, hours _____ Over 24
Treated surface, minutes _____ 10–15

It is manifest from the data of Table 2, that the advantage of accelerating the curing of the film of the surface-active agent is retained also in the case of welded apparatus.

Another advantage resulting from the method in accordance with this instant invention is that the hardened film of surface-active agent firmly adheres to the apparatus. Table 3 below gives comparative data of the adherence of the film, from two types of conventional paints, such as epoxy type and/or coal tar epoxy type, that is, for example, Shell's "Epicote" or Japanese domestic "Bituluck 203."

TABLE 3

| Type of resin | Untreated surface | Treated surface |
|---|---|---|
| Film of Epoxy paint | 0 | 77 |
| Film of Epoxy coal tar paint | 0 | 97 |

The data of Table 3 undisputably show that the resistance to peeling and adhesion are increased, 77 times in the case of the epoxy resin base paint (Shell's "Epicote"), and 97 times in the case of the epoxy coal tar paint (Japanese domestic "Bituluck 203") when a film of microcrystalline phosphates or chromates is applied first upon the surface.

LIST 1.—SOLIDIFYING AGENTS SUITABLE FOR USE IN INVENTIVE METHOD

| Generic Name | | Specific Material | |
|---|---|---|---|
| | | Polyacrylate emulsion Urea-formaldehyde resin Polyvinylacetate Polyvinylchloride Alkyd resin Polyvinylidenechloride | |
| Synthetic resin | Acrylic resin | Polyacrylic acid Polyacrylamid Polysodium acrylate Polyammonium acrylate | Preferably added |
| | Amino resin | Dimethylolmelamine Methoxy methyl melamine | |
| | Phenolic resin | Phenol-Formaldehyde resin Resorcinol-formaldehyde resin Cresol-formaldehyde resin | |
| | Others | Polyvinyl alcohol ethylhydroxy cellulose Hydroxy cellulose Polyvinyl pyrrolidene Polyvinyl methyl ether | |

LIST 2.—SURFACE ACTIVE AGENTS USED FOR EXPERIMENTS OF TABLE 1

| Agent for increasing adhesiveness | Generic Name | Specific Material |
|---|---|---|
| | Synthetic resin | Urea-formaldehyde resin |
| | Protein | Gelatin |
| Foaming agent | Alkylarylsulfonate | Sodium alkylarylsulfonate. |
| Solvent | Water | Pure water. |
| Hardener | Inorganic acid | Phosphoric acid. |

Although specific examples have been described in detail for the purpose of greater clarification, the instant invention is not limited thereto. It is manifest that the method of the invention may be readily adapted to glass vessels, which have to be evacuated rather than used under pressure, and that a gas may merely be passed through the apparatus at normal pressure, to detect leakages. Also, with glass equipment where rust is not present, the solution being applied will contain zinc dihydrogen phosphate or iron chromate, rather than chromic anhydride, or phosphoric acid. Those skilled in the art will readily visualize that several modifications and variations are possible, without departing from the spirit of the invention which is to be limited only by the scope of the appended claims.

What is claimed is:

1. A method for detecting leakages in equipment, which comprises locally applying an aqueous solution of a substance, capable of forming a continuous microcrystalline film on evaporation of water, allowing the water to evaporate and deposit a microcrystalline continuous film of said substance, externally applying as an indicator a surface-active agent which is a member selected from the group consisting of soap, anionic and nonionic surface-active agents, whereby a stable foam is produced from said surface-active agent upon said microcrystalline film, which lasts for at least 30 minutes and simultaneously introducing a gas within said equipment, whereby said gas escapes from said equipment at the points of leakage in a continuous finely dispersed form.

2. The method according to claim 1 wherein said solution comprises at least one member selected from the group consisting of phosphoric acid, phosphates of metals from barium to iron in the electromotive series, chromic anhydride chromates and dichromates of sodium, potassium and lithium.

3. The method according to claim 2 wherein said phosphate is $Zn(H_2PO_4)_2$ and the iron in the rust of said equipment reacts therewith, to yield a microcrystalline layer of zinc and iron pyrophosphate and metaphosphate.

4. The method according to claim 2 wherein phosphoric acid reacts with the iron in the rust of said equipment to yield a microcrystalline film of iron pyrophosphate and metaphosphate.

5. The method according to claim 2 wherein said aqueous solution comprises chromic anhydride, and the iron in the rust of the equipment reacts therewith, to yield a microcrystalline layer of $FeCrO_4$.

6. The method according to claim 1 in which said aqueous solution includes an organic solvent which is at least partially miscible with water.

7. The method according to claim 6 wherein said solvent is a member selected from the group consisting of isopropyl alcohol, n-butyl alcohol, isobutyl and tert. butyl alcohol.

8. The method according to claim 1 wherein said aqueous solution additionally comprises a surface-active agent in an amount of 1 to 3 parts per 80 parts of water.

9. The method according to claim 1 wherein said surface-active agent used as an indicator additionally contains a solidifying agent whereby the formation of a stable solid foam is accelerated.

10. The method of detecting leaks in process equipment which comprises locally applying a solution comprising 80 parts of water, 20 parts of orthophosphoric acid, 5 parts of butyl alcohol, 2 parts of polyoxyethylene alkyl phenol ether, allowing the solution to dry, whereby the orthophosphoric acid reacts with the rust in said equipment and deposits a microcrystalline film of iron pyrophosphate and metaphosphate, externally applying an aqueous solution of sodium alkyl allyl sulfonate, whereby a fine foam is produced which has a life of at least 30 minutes, simultaneously introducing a gas in the interior of said equipment, whereby said gas escapes in a finely dispersed form.

11. The method of detecting leaks in process equipment which comprises locally applying a solution comprising 79 parts of water, 5 parts of zinc dihydrogen phosphate, 5 parts of butyl alcohol, 2 parts of polyoxyethylene alkyl phenol ether, allowing the solution to dry whereby the zinc dihydrogen phosphate reacts with the rust in said equipment and deposits a crystalline film of iron and zinc pyrophosphate and metaphosphate, externally applying an aqueous solution of sodium dodecylbenzene sulfonate additionally comprising a solidifying agent, whereby a stable solid foam is produced, and simultaneously introducing a gas in the interior of said equipment, whereby said gas escapes in a finely dispersed form.

12. The method of detecting leaks in process equipment which comprises locally applying a solution comprising 75 parts of water, 5 parts of zinc dihydrogen phosphate and 5 parts of chromic anhydride, 5 parts of isopropyl alcohol, 2 parts of polyoxyethylene alkyl phenol ether, allowing the solution to dry, whereby the zinc dihydrogen phosphate and chromic anhydride react with the rust in said equipment and deposit a crystalline film of iron chromate, zinc pyrophosphate and metaphosphate, externally applying an aqueous solution of sodium dodecylbenzene sulfonate additionally comprising urea-formaldehyde resin plus gelatine as a solidifying agent, whereby a stable solid foam is produced, and simultaneously introducing a gas in the interior of said equipment, whereby said gas escapes in a finely dispersed form.

References Cited

UNITED STATES PATENTS 2,665,257   1/1954.   Potter.

LOUIS R. PRINCE, *Primary Examiner.*

J. NOLTON, *Assistant Examiner.*